United States Patent
Iimori et al.

(10) Patent No.: US 9,389,134 B2
(45) Date of Patent: Jul. 12, 2016

(54) SYNTHETIC RESIN BASED PRESSURE SENSOR WITH A THREE-DIMENSIONAL CIRCUIT

(71) Applicant: NAGANO KEIKI CO., LTD., Tokyo (JP)

(72) Inventors: Yukinobu Iimori, Tokyo (JP); Hironori Kobayashi, Tokyo (JP); Shuji Tohyama, Tokyo (JP)

(73) Assignee: NAGANO KEIKI CO., LTD., Tokyo (JP)

(*) Notice: Subject to any disclaimer, the term of this patent is extended or adjusted under 35 U.S.C. 154(b) by 204 days.

(21) Appl. No.: 14/296,565

(22) Filed: Jun. 5, 2014

(65) Prior Publication Data
US 2014/0360277 A1    Dec. 11, 2014

(30) Foreign Application Priority Data

Jun. 10, 2013  (JP) .................................. 2013-121744

(51) Int. Cl.
*G01L 19/00*    (2006.01)
*G01L 19/14*    (2006.01)

(52) U.S. Cl.
CPC ......... *G01L 19/0069* (2013.01); *G01L 19/0061* (2013.01); *G01L 19/147* (2013.01)

(58) Field of Classification Search
None
See application file for complete search history.

(56) References Cited

U.S. PATENT DOCUMENTS

| | | | | |
|---|---|---|---|---|
| 6,584,851 B2* | 7/2003 | Yamagishi | .......... | G01L 19/0084 73/715 |
| 6,609,427 B1* | 8/2003 | Westfield | ................. | G01D 1/00 73/700 |
| 7,073,375 B2* | 7/2006 | Parker | ..................... | F01N 3/021 73/114.76 |
| 7,370,536 B2* | 5/2008 | Ueyanagi | ............ | G01L 19/0084 73/715 |
| 7,600,433 B2* | 10/2009 | Koehler | ................ | G01L 19/147 73/753 |

(Continued)

FOREIGN PATENT DOCUMENTS

| | | |
|---|---|---|
| JP | 61-140934 U | 9/1986 |
| JP | 2005-147795 | 6/2005 |

(Continued)

OTHER PUBLICATIONS

European Search Report dated Nov. 12, 2014, Application No. 14171615.9, 6 pages.

(Continued)

*Primary Examiner* — Andre Allen
(74) *Attorney, Agent, or Firm* — Rankin, Hill & Clark LLP (57) ABSTRACT

A sensor includes: a housing with a terminal; a joint including a projecting portion; a sensor module provided to the projecting portion and including a strain gauge; a conductive member connecting the terminal and the strain gauge; a cap-shaped synthetic resin base provided to the projecting portion, including a top with an opening in which the strain gauge is exposed and lateral portions intersecting the top, and having an inner circumferential surface slidable along an outer circumferential surface of the projecting portion; and an electronic component mounted on the lateral portions. The conductive member includes: a flexible circuit board having a first end connected to the terminal and a second end connected to the base; and a three-dimensional circuit connected to the electronic component, three-dimensionally arranged continuously along the top and the lateral portions of the base, and having one end connected to the flexible circuit board.

6 Claims, 12 Drawing Sheets

(56) References Cited

U.S. PATENT DOCUMENTS

| | | | |
|---|---|---|---|
| 2002/0062697 A1* | 5/2002 | Yamagishi | G01L 19/0084 73/715 |
| 2003/0057423 A1* | 3/2003 | Shimoda | H01L 21/6835 257/80 |
| 2010/0206085 A1* | 8/2010 | Sekiya | G01L 19/148 73/723 |
| 2014/0360277 A1* | 12/2014 | Iimori | G01L 19/0069 73/715 |
| 2015/0115478 A1* | 4/2015 | Otsuki | H01L 23/12 257/784 |
| 2015/0160085 A1* | 6/2015 | Kobayashi | G01L 9/0041 73/723 |

FOREIGN PATENT DOCUMENTS

| | | |
|---|---|---|
| JP | 2009-053086 | 3/2009 |
| JP | 2010-190655 | 9/2010 |

OTHER PUBLICATIONS

Japanese Office Action dated Aug. 18, 2015 and English Translation, 7 pages.

* cited by examiner

SYNTHETIC RESIN BASED PRESSURE SENSOR WITH A THREE-DIMENSIONAL CIRCUIT

The entire disclosure of Japanese Patent Applications No. 2013-121744 flied Jun. 10, 2013 is expressly incorporated by reference herein.

TECHNICAL FIELD

The present invention relates to a pressure sensor for measuring pressure of target fluid and other sensors.

BACKGROUND ART

Pressure sensors are used to measure pressure of target fluid. Some pressure sensors include: a joint provided with a port through which target fluid is introduced; and a sensor module provided on the joint and including a diaphragm displaceable in response to the pressure of the introduced fluid. The displacement of the diaphragm is converted into a signal and outputted.

According to a typical arrangement of such pressure sensors (Patent Literature 1: JP-A-2010-190655), for instance, a sensor module is provided on a joint, the sensor module being accommodated in a housing provided with a terminal electrically connected to a diaphragm of the sensor module through a flexible circuit board. The joint is also provided with a cap-shaped metal base, the top of the base is provided with an opening in which the diaphragm is exposed, a part of the flexible circuit board is arranged on a lateral portion of the base intersecting the top of the base provided with the opening, and an electronic component is mounted on this part of the flexible circuit board.

In this typical arrangement, outwardly projecting flanges are provided to the open end of the base at opposite positions and these two flanges are brought into contact with the vicinity of an attachment groove provided to the joint to position the base.

In the typical arrangement of Patent Literature 1, after mounted with the electronic component, the flexible circuit board is wound on the base.

It takes time and effort to mount the electronic component on the flexible circuit board and wind the flexible circuit board mounted with the electronic component on the base along the top and the lateral portion of the base.

In the typical arrangement of Patent Literature 1, the flanges, which are provided to the open end of the base at the two positions, are brought into contact with the vicinity of the attachment groove of the joint to position the base. As a result, the structure of the base becomes complicated due to the presence of the flanges. Further, the positioning of the base is necessarily performed at a position remote from the center of the base. The base is formed in the shape of an elongated cap with a length in a first direction being longer than a length in a second direction perpendicular to the first direction in a plan view, so that a cap, which is relatively wide particularly in the first direction, is present between an inner circumferential surface of the base and an outer circumferential surface of a projecting portion of the joint, which makes the positioning of the base relative to the joint difficult.

Therefore, it is not easy to accurately position the base relative to the sensor module provided to the joint. When the base is inaccurately positioned relative to the sensor module (e.g., the center of the base is misaligned with the center of the sensor module or a flat diaphragm surface of the sensor module is not parallel with a flat top surface of the base), the diaphragm and the flexible circuit board cannot be accurately bonded.

SUMMARY OF THE INVENTION

An object of the invention is to provide a sensor capable of being fabricated by a simple assembling process with improved production efficiency.

According to an aspect of the invention, a sensor includes: a joint including: a port through which target fluid is introduced; and a projecting portion that projects from a bottom of the joint along the port; a sensor module being provided to the joint, the sensor module including a detector that is displaceable in response to a pressure of the introduced target fluid; a housing in which the sensor module is accommodated, the housing including a terminal; a conductive member being configured to electrically connect the detector of the sensor module to the terminal; a cap-shaped synthetic resin base being provided to the projecting portion of the joint, the synthetic resin base having a top provided with an opening in which the detector of the sensor module is exposed, the synthetic resin base having an inner circumferential surface slidable along an outer circumferential surface of the projecting portion of the joint; and an electronic component being provided to a lateral portion of the synthetic resin base that intersects the top of the synthetic resin base provided with the opening, in which the conductive member includes: a flexible circuit board haying a first end connected to the terminal and a second end connected to the synthetic resin base; and a three-dimensional circuit being connected to the electronic component, the three-dimensional circuit being three-dimensionally arranged continuously along the top and the lateral portion of the synthetic resin base, the three-dimensional circuit having one end connected to the flexible circuit board.

In the above arrangement, the electronic component is mounted directly on the synthetic resin base provided with the three-dimensional circuit, so that the sensor can be fabricated by a simple assembling process without the necessity of winding the flexible circuit board on the synthetic resin base continuously along the top and lateral portion thereof.

Further, when the synthetic resin base is to be attached to the joint, while the projecting portion of the joint, Which projects along the port of the joint, is inserted into the synthetic resin base, the synthetic resin base is slid along an outer circumferential surface of the projecting portion and thus the axial and circumferential positions of the synthetic resin base can be easily adjusted. In other words, while the sensor module is positioned relative to the projecting portion (i.e., a central portion of the joint), the synthetic resin base is aligned with the projecting portion, so that the synthetic resin base can be easily positioned relative to the detector of the sensor module with accuracy. Therefore, the three-dimensional circuit on the top of the synthetic resin base can be easily electrically connected to the detector of the sensor module.

As a result, the sensor can be fabricated by a simple assembling process with improved production efficiency.

In the above aspect, it is preferable that the inner circumferential surface of the synthetic resin base and the outer circumferential surface of the projecting portion of the joint be cylindrically formed.

In the above arrangement, the circumferential position of the synthetic resin base is adjustable as desired, so that the circumferential and axial positions of the synthetic resin base can be smoothly adjusted.

It is preferable that the joint be made of metal and the lateral portion of the synthetic resin base be provided with a grounding lead having an end that reaches an open end of the synthetic resin base opposed to the bottom of the joint.

In the above arrangement, the electronic component is grounded through the grounding lead and the joint. In other words, the electronic component can be easily grounded as long as the grounding lead is provided to the synthetic resin base.

Further, the grounding can be done without the necessity of applying an electrically conductive adhesive between the electronic component and the joint, so that no electrically conductive adhesive sticks to the three-dimensional circuit except a grounding portion. Specifically, according to the typical arrangement of Patent Literature 1, when an electrically conductive adhesive is used for grounding connection between the flexible circuit board and the base, since the flexible circuit board and the base are connected within the same plane as a bonding pad and the sensor module are present, the electrically conductive adhesive may unintentionally stick to a pattern other than the grounding portion. Further, the typical arrangement of Patent Literature 1 requires masking for preventing solder from sticking during a mounting process because the bonding pad is present within the same plane as the electronic component is mounted. In contrast, according to the aspect of the invention, grounding can be easily done without the necessity of an electrically conductive adhesive and masking.

In the above aspect, it is preferable that the open end of the synthetic resin base and the bottom of the joint be fixed to each other with an electrically conductive adhesive.

In the above arrangement, fixation of the synthetic resin base to the joint and grounding can be easily and reliably done. Further, since the electrically conductive adhesive is applied between the open end of the synthetic resin base and the bottom of the joint (i.e., the electrically conductive adhesive is applied only to the grounding portion), no electrically conductive adhesive sticks to a pattern other than the grounding portion.

In the above aspect, it is preferable that the lateral portion of the synthetic resin base include opposed flat portions on which the electronic component is mountable.

In the above arrangement, a portion for mounting an electronic component is provided by two flat portions, which can be subjected to squeegee printing of solder in the same manner as a double-sided substrate and a usual chip mounter for mounting electronic components can be used to mount the electronic component on the flat portions.

In the above aspect, it is preferable that a bonding-connection pad to which the detector of the sensor module is wire-bonded be coplanar with an external-connection pad for external connection.

In the above arrangement, the bonding-connection pad is coplanar with the external-connection pad and thus bonding can be easily done.

DESCRIPTION OF EMBODIMENT(S)

Exemplary embodiment(s) of the invention will be described below with reference to the attached drawings.

Figure 1:
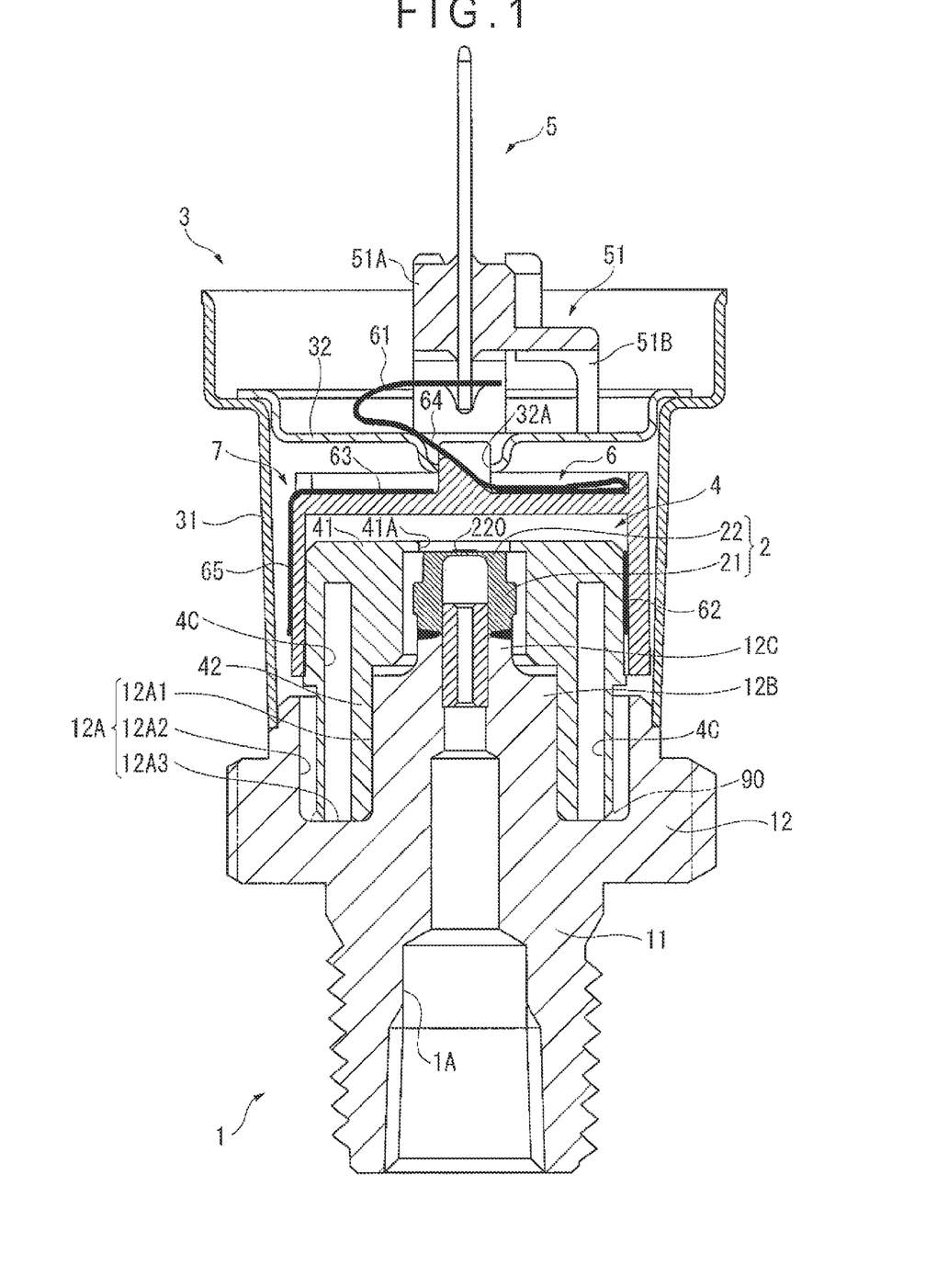
FIG. 1 is a sectional front elevation showing a sensor according to an exemplary embodiment of the invention.
Figure 2:
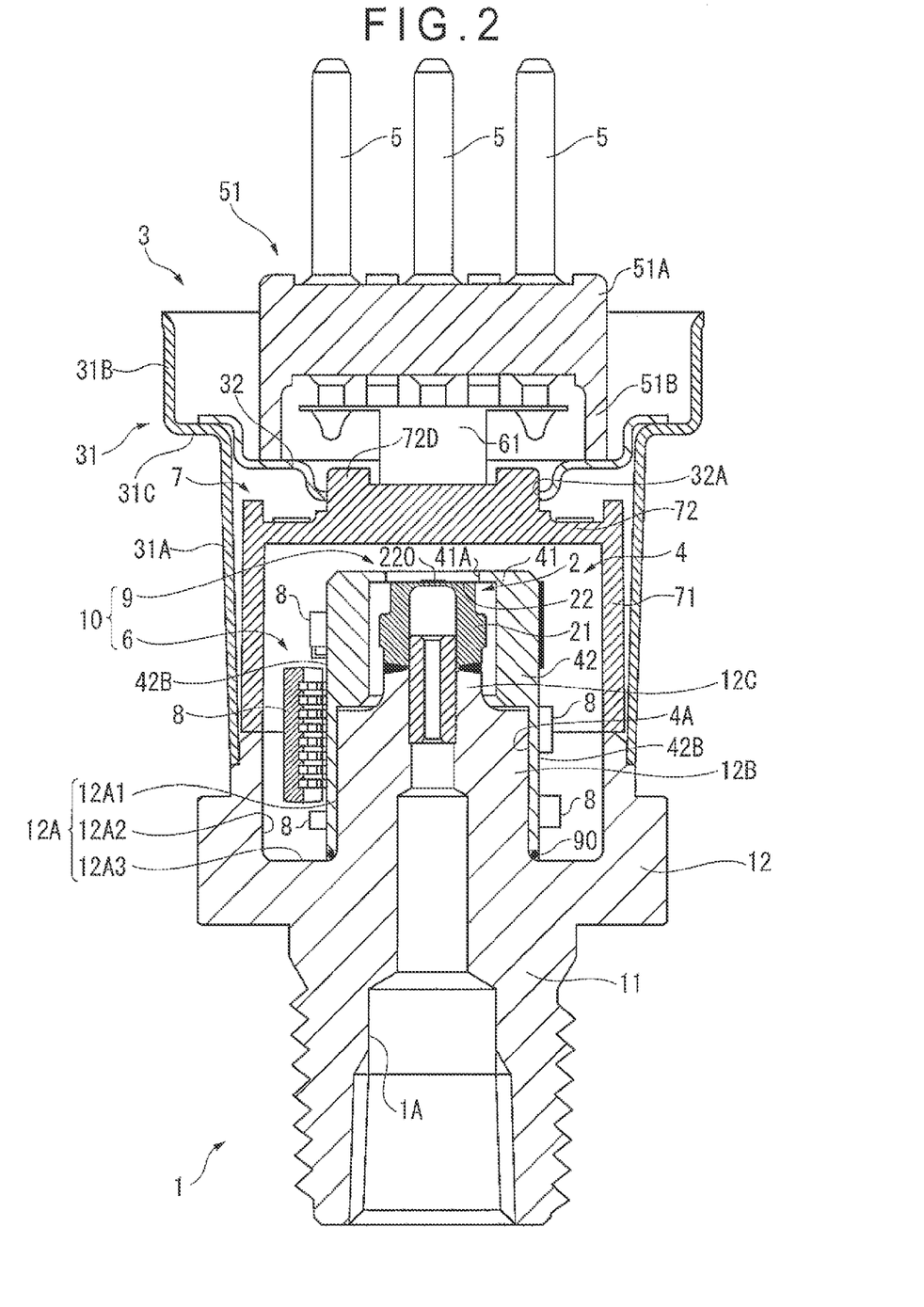
FIG. 2 is a sectional side elevation showing the sensor.

FIG. 1 is a sectional front elevation showing a sensor according to this exemplary embodiment of the invention and FIG. 2 is a sectional side elevation showing the sensor.

As shown in FIGS. 1 and 2, the sensor includes: a joint 1; a sensor module 2 provided to the joint 1; a housing 3 in which the sensor module 2 is accommodated; a cap-shaped synthetic resin base 4 accommodated in the housing 3 and attached to the joint 1; a terminal 5 provided to the housing 3; a flexible circuit board 6 that electrically connects the terminal 5 to the sensor module 2; a spacer 7 on which the flexible circuit board 6 is partially supported; and an electronic component 8 mounted on the synthetic resin base 4. Incidentally, the electronic component 8 may be a capacitor, an IC chip or any other electronic component.

The joint 1 is a metal member including: a shaft 11 provided with a port 1A through which target fluid is introduced; and a flange 12 radially projecting from a center portion of the shaft 11.

A first end of the shaft 11 is threaded to be screwed into a mount (not shown) and a second end of the shaft 11 is welded to the sensor module 2.

A surface of the flange 12 facing the sensor module 2 is provided with an annular dent 12A formed around the port 1A. The dent 12A is a cross-sectionally rectangular space defined by: an inner wall 12A1 having a diameter larger than an outer circumferential diameter of the sensor module 2; an outer wall 12A2 concentric with the inner wall 12A1; and a bottom 12A3 connecting the lower edges of the inner wall 12A1 and the outer wall 12A2.

The inner wall 12A1 is rounded to define a cylindrical portion, i.e., a projecting portion 12B, projecting from the bottom 12A3 along the port 1A.

The tip end of the projecting portion 12B serves as a mount 12C on which the sensor module 2 is mounted. The mount 12C is smaller in diameter than the projecting portion 12B.

The sensor module 2 is a metal member including a cylindrical portion 21, for instance, welded to the mount 12C of the joint 1; and a diaphragm 22 formed integrally with an end of the cylindrical portion 21.

The diaphragm 22 includes a strain gauge 22G (i.e., detector) (see FIG. 3) that detects the pressure of the target fluid introduced into the sensor module 2.

The housing 3 includes: a cylindrical metal case 31 with an open first end being welded to the flange 12; and a metal lid 32 provided near a second end of the case 31.

The case 31 includes: a small-diameter portion 31A in which the sensor module 2 is accommodated; and a large-diameter portion 31B with a first end that is connected to an end of the small-diameter portion 31A and a second end that is open.

The lid 32 is configured to close the end of the small-diameter portion 31A. The center of the lid 32 is provided with a hole 32A engageable with a part of the spacer 7. The periphery of the lid 32 is held on a corner 31C connecting the small-diameter portion 31A and the large-diameter portion 31B.

The terminal 5 is insert-molded to a synthetic resin attachment member 51. The attachment member 51, which is in the shape of a saddle, includes; a body 51A that supports the terminal 5; and legs 51B located at both sides of the body 51A and formed integrally with the body 51A. The lid 32 supports the legs 51B. In this exemplary embodiment, three terminals 5 are arranged side by side in a longitudinal direction of the body 51A.

Ends of the terminals 5 are exposed on the body 51A of the attachment member 51 and the exposed portions of the terminals 5 are connected to a first end of the flexible circuit board 6.

The synthetic resin base 4 includes: a flat plate-shaped top 41 being opposed to a flat surface of the diaphragm 22; and a wall 42 being formed integrally with the top 41 and having an inner circumferential surface opposed to an outer circumferential surface of the sensor module 2.

FIGS. 3 to 10 show the arrangement of the synthetic resin base 4 in detail.

Figure 3:
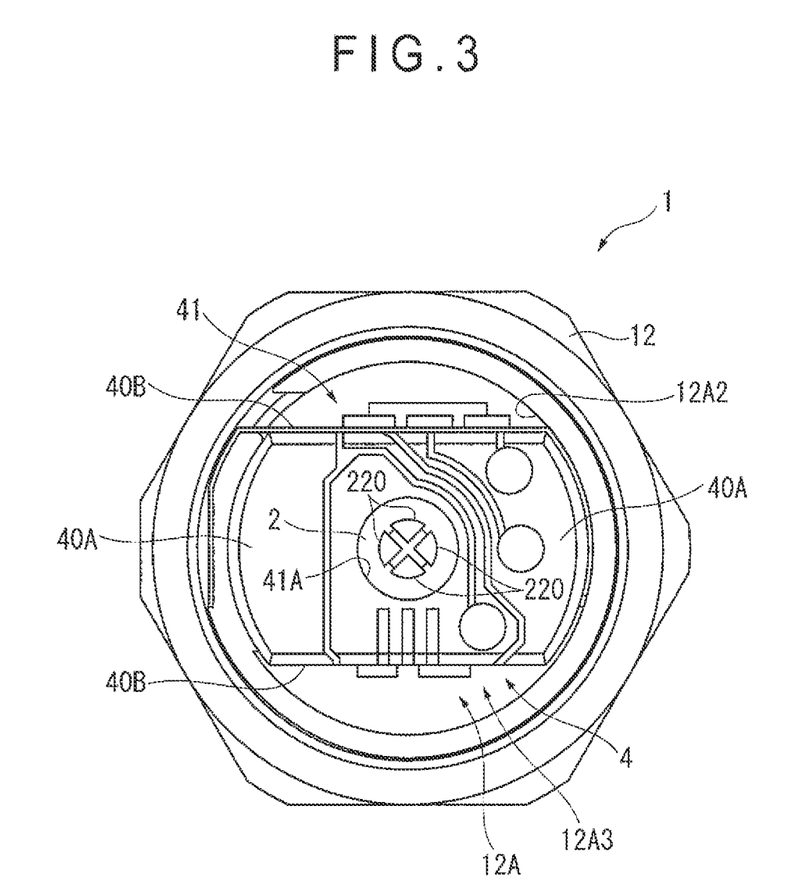
FIG. 3 is a top view showing a synthetic resin base attached to a joint.
Figure 4:
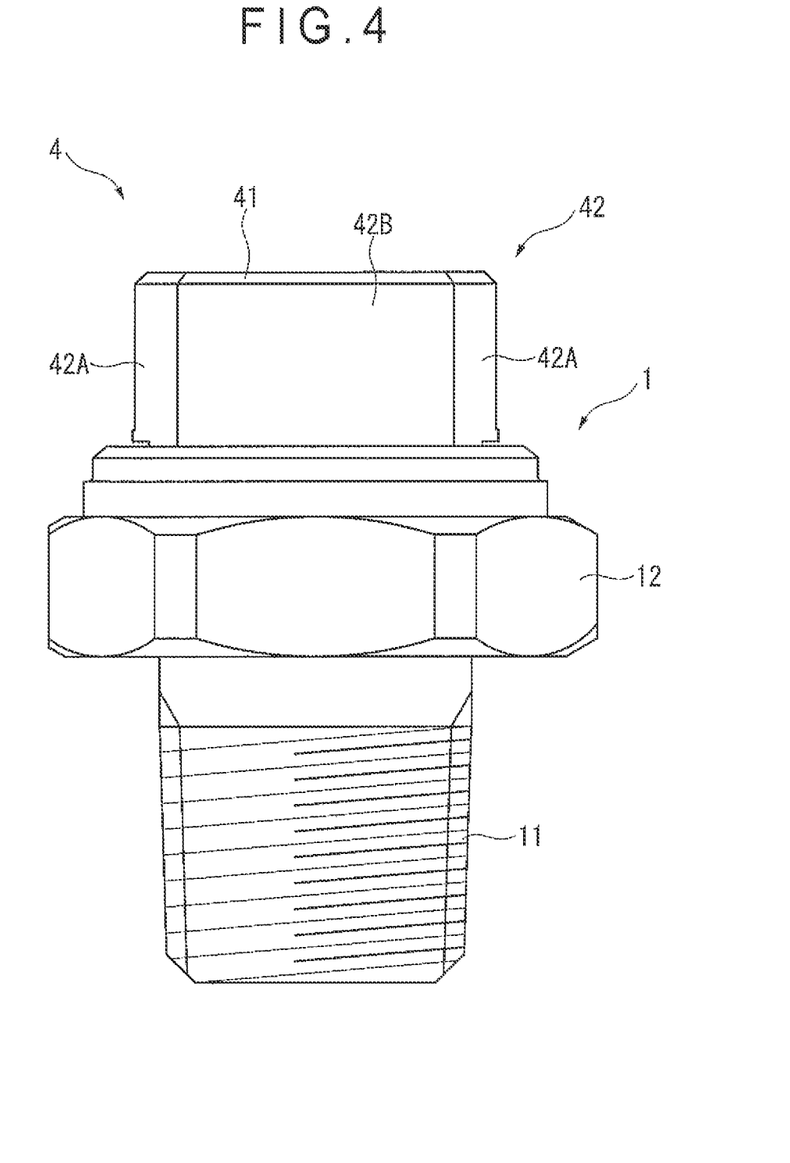
FIG. 4 is a front view showing the synthetic resin base attached to the joint.

FIG. 3 is a top view showing the synthetic resin base 4 attached to the joint 1 and FIG. 4 is a front view showing the same. Incidentally, the electronic component is not shown in FIG. 4.

As shown in FIGS. 3 and 4, the top 41 of the synthetic resin base 4 is provided with a circular opening 41A in which the strain gauge 220 of the sensor module 2 is exposed.

The outline of the flat surface of the top 41 is defined by a pair of opposed arcs 40A and a pair of linear portions 40B connecting the ends of the arcs 40A.

The arcs 40A are concentric with an arc defined by the outer wall 12A2 of the flange 12.

The wall 42 includes: curved portions 42A being shaped in conformity with the arcs 40A of the top 41; and a flat plate-shaped lateral portions 42B connecting the curved portions 42A. The wall 42 projects from the flange 12 by a predetermined length with a portion of the synthetic resin base 4, including the top 41, being exposed on the flange 12.

Figure 5:
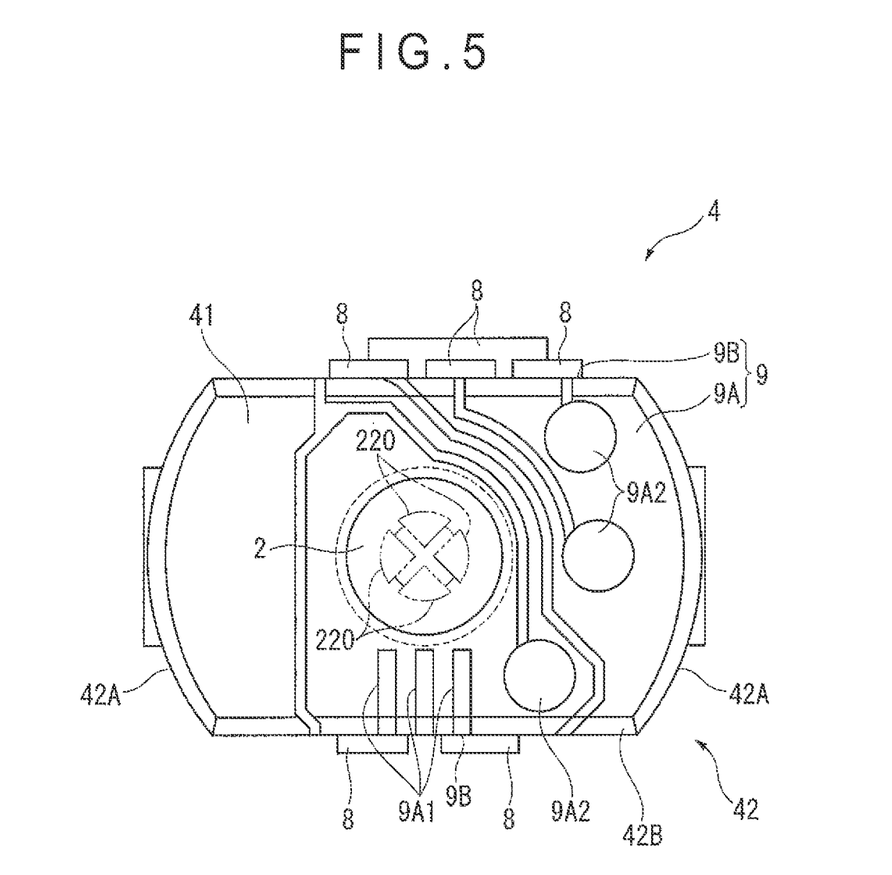
FIG. 5 is a top view showing the synthetic resin base.
Figure 6:
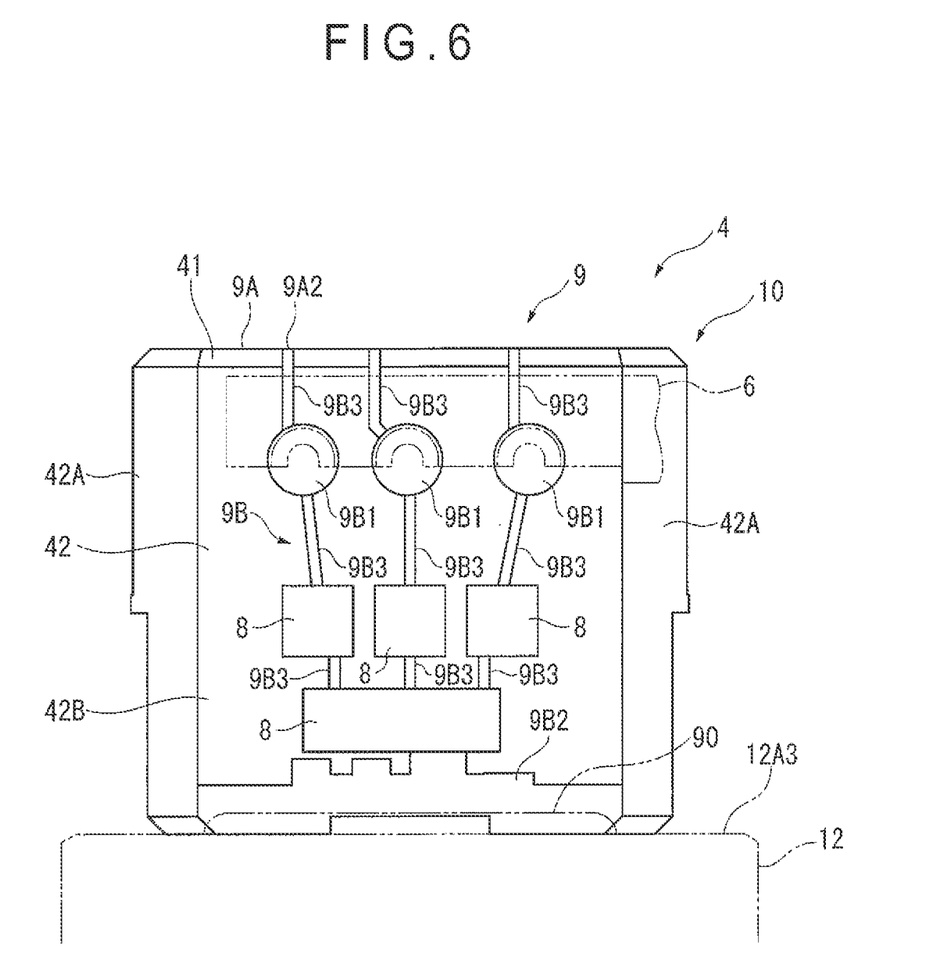
FIG. 6 is a side view showing a side of the synthetic resin base.
Figure 7:
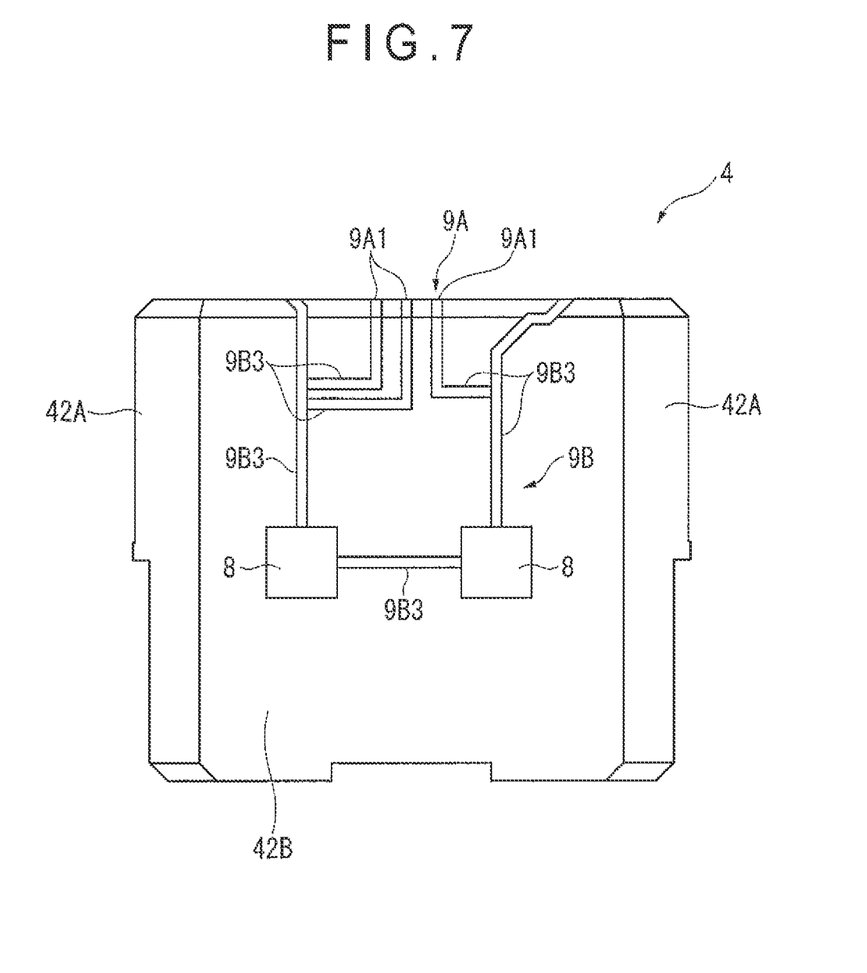
FIG. 7 is a side view showing a side of the synthetic resin base opposite to the side shown by FIG. 6.

FIG. 5 is a top view showing the synthetic resin base 4 and FIGS. 6 and 7 are side views showing the synthetic resin base 4.

As shown in FIGS. 5 to 7, the synthetic resin base 4 is provided with a three-dimensional circuit 9 with one end that is connected to the flexible circuit board 6. In this exemplary embodiment, the flexible circuit board 6 and the three-dimensional circuit 9 in combination serve as a conductive member 10 that electrically connects the strain gauge 220 of the sensor module 2 and the terminals 5.

The three-dimensional circuit 9, which is a circuit in a three-dimensional shape, includes: a top circuit 9A provided on the top 41 of the synthetic resin base 4; and a side circuit 9B provided on the lateral portions 42B. The top circuit 9A and the side circuit 9B are continuous with each other.

The top circuit 9A includes: a bonding-connection pad 9A1 wire-bonded to the strain gauge 220 of the sensor module 2; and an external-connection pad 9A2 for external connection. The bonding-connection pad 9A1 and the external-connection pad 9A2 are coplanar with each other.

The side circuit 9B includes two side circuits, i.e., first and second side circuits, that are provided on the exterior of the opposed lateral portions 42B of the synthetic resin base 4 and each have a flat surface on which the electronic component 8 is mounted.

As shown in FIG. 6, the first side circuit 9B includes a substrate-connection pad 9B1 to be connected to the flexible circuit board 6 and a grounding lead 9B2. The substrate-connection pad 9B1 is connected to the flexible circuit board 6 by an appropriate means such as soldering.

A pattern 9B3 is used to connect the external-connection pad 9A2 and the substrate-connection pad 9B1 and to connect the substrate-connection pad 9B1 and the electronic component 8. The electronic component 8 is provided between the grounding lead 9B2 and the pattern 9B3.

The grounding lead 9B2 has an end that reaches an open end of the synthetic resin base 4 opposed to the bottom 12A3 of the joint 1.

The end of the grounding lead 9B2 that reaches the open end is bonded to the bottom 12A3 of the joint 1 with an electrically conductive adhesive 90.

As shown in FIG. 7, the second side circuit 9B includes another pattern 9B3 that connects the bonding-connection pad 9A1 and the electronic component 8. Incidentally, FIGS. 2, 5 and 7 inconsistently show the electronic component(s) 8 due to omission of a part of the electronic component(s) 8 in FIGS. 5 and 7 for making the invention easily understandable.

Figure 8:
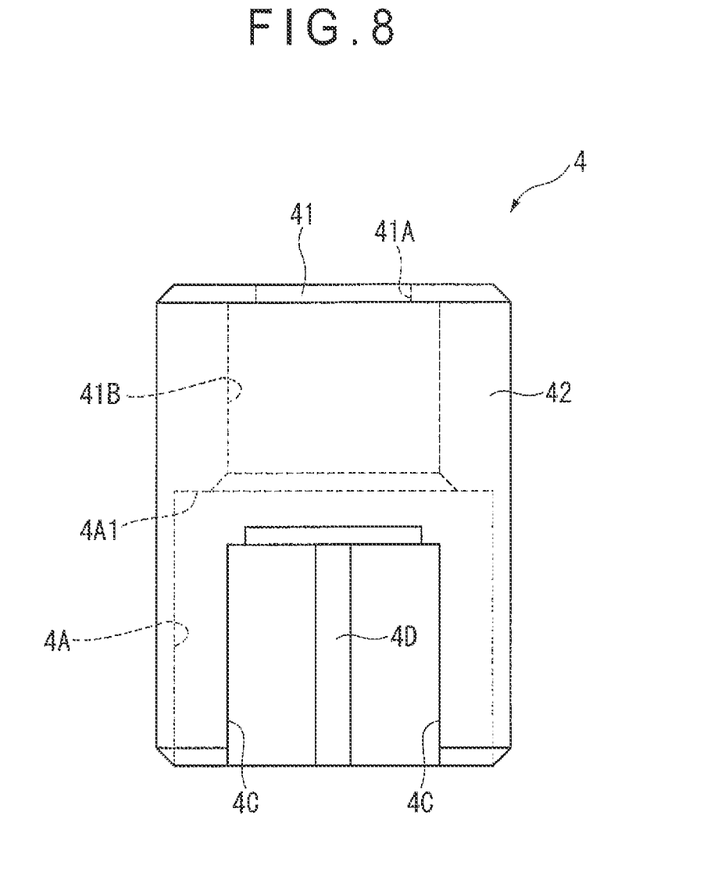
FIG. 8 is another side view showing a side of the synthetic resin base viewed in a direction different from the directions of FIGS. 6 and 7.
Figure 9:
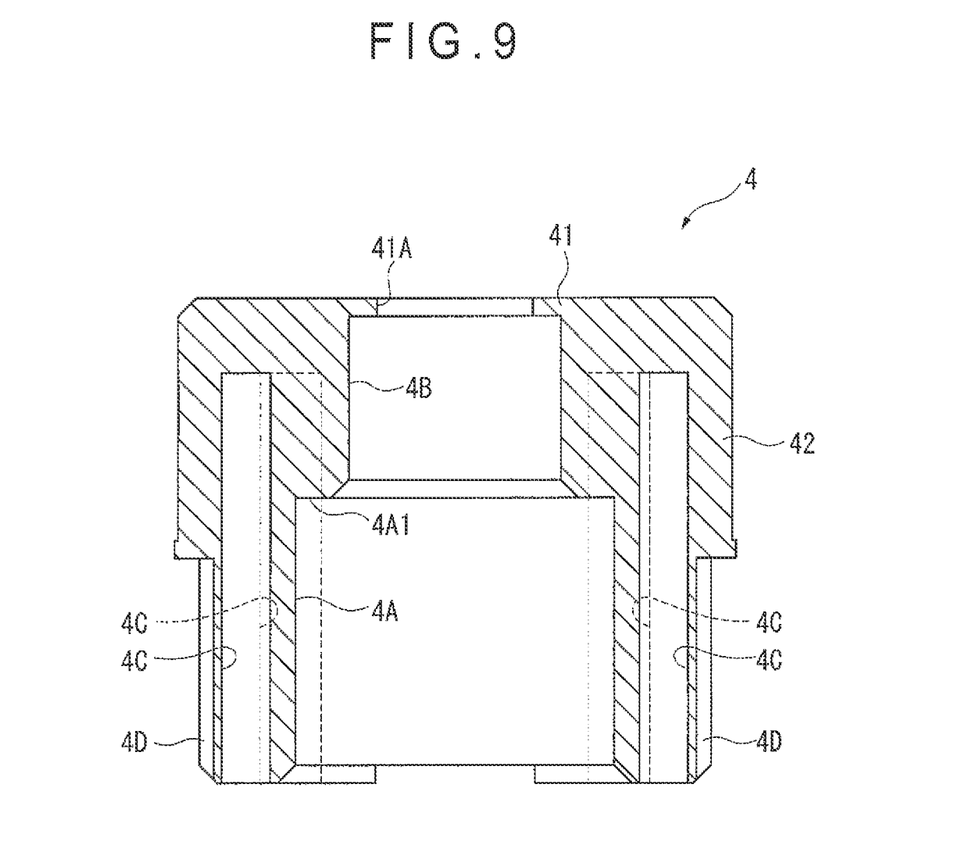
FIG. 9 is a sectional view showing the synthetic resin base.
Figure 10:
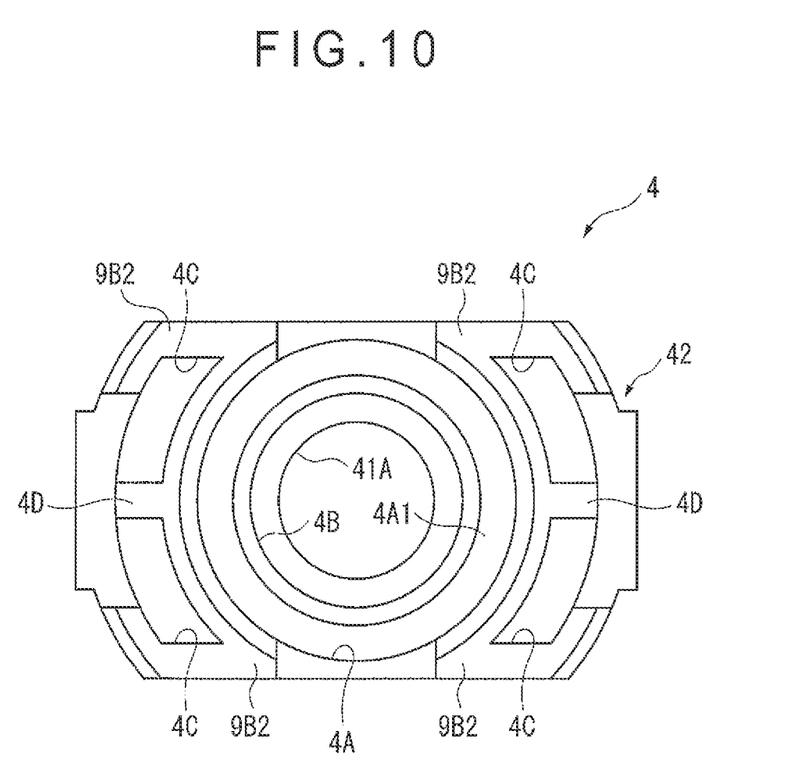
FIG. 10 is a bottom view showing the synthetic resin base.

Description will be made on an inner arrangement of the synthetic resin base 4. FIG. 8 is another side view showing a side of the synthetic resin base 4 viewed in a direction different from the directions of FIGS. 6 and 7. FIG. 9 is a sectional view showing the synthetic resin base 4. FIG. 10 is a bottom view showing the synthetic resin base 4. Incidentally, the electronic component 8 is not shown in FIGS. 8 to 10.

As shown in FIGS. 1, 2 and 8 to 10, the synthetic resin base 4 has an inner circumferential surface 4A that extends from the open end of the synthetic resin base 4 up to approximately half the height of the synthetic resin base 4, the inner circumferential surface 4A being slidable along an outer circumferential surface of the projecting portion 12B of the joint 1. A housing space 4B, in which the sensor module 2 is to be accommodated, is defined from an upper edge of the inner circumferential surface 4A to the opening 41A.

The inner circumferential surface 4A and the outer circumferential surface of the projecting portion 12B of the joint 1, which are in close contact with each other, are cylindrically shaped to be relatively rotatable in a circumferential direction and slidable it an axial direction.

The housing space 4B is in a cylindrical shape smaller in diameter than a space defined by the inner circumferential surface 4A and a stepped portion 4A1 between the inner circumferential surface 4A and the housing space 4B is opposed to a shoulder of the projecting portion 12B.

In order to reduce the weight of the synthetic resin base 4, weight-reducing hollow spaces 4CA are provided at four positions in a radial direction from the inner circumferential surface 4A. The weight-reducing hollow spaces 4C extend from the open end of the synthetic resin base 4 to a predetermined level along a longitudinal axis of the space defined by the inner circumferential surface 4A.

A rib 4D is provided between adjacent ones of the weight-reducing hollow spaces 4C.

Figure 11:
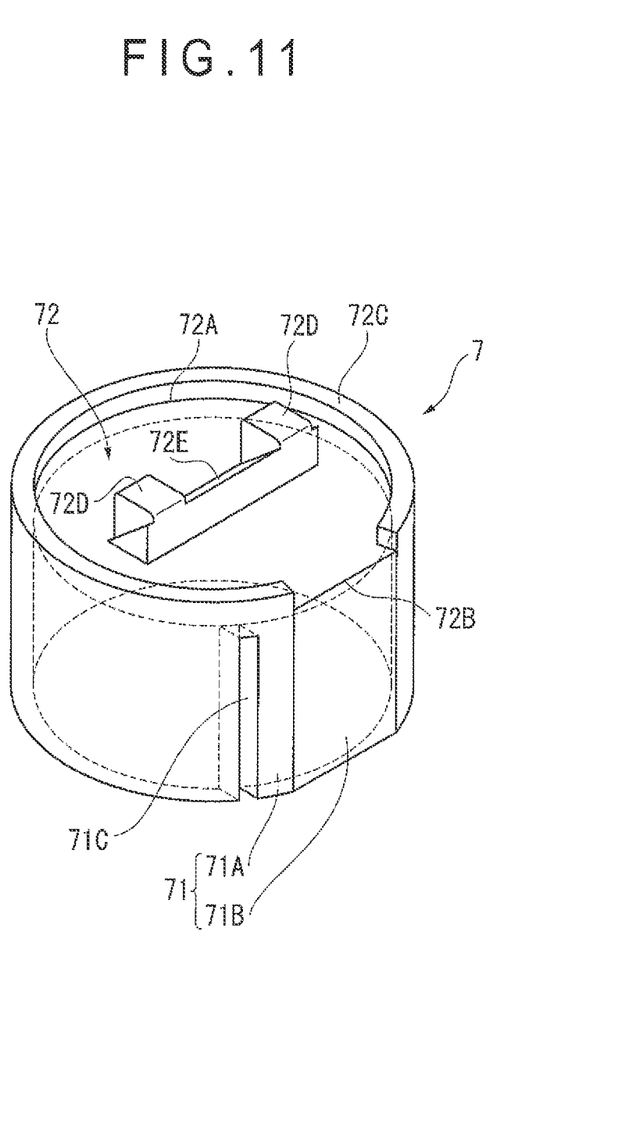
FIG. 11 is a perspective view showing a spacer.

FIG. 11 shows an arrangement of the spacer 7 in detail. FIG. 11 is a perspective view showing the spacer 7.

As shown in FIGS. 1, 2 and 11, the spacer 7, which is configured to cover the synthetic resin base 4, includes: a cylindrical portion 71 with a first end that is engaged with or bonded to the flange 12 of the joint 1; and a top plate 72 that closes a second end of the cylindrical portion 71.

The cylindrical portion 71 has an outer circumferential surface opposed to an inner circumferential surface of the case 31 and an inner circumferential surface (i.e., an arc surface) being substantially in conformity with the outer wall 12A2 of the dent 12A. The cylindrical portion 71 includes: a round portion 71A that is partially axially cut away; and a flat plate 71B with which the cut of the round portion 71A is filled, the round portion 71A and the flat plate 71B being formed integrally with each other. The cylindrical portion 71 is provided with an insert slit 71C with a predetermined length that extends from an open end of the round portion 71A along an axial direction of the round portion 71A. The flexible circuit board 6 is to be inserted through the insert slit 71C.

The top plate 72, the shape of which conforms to that of an end surface of the cylindrical portion 71, has an arc portion 72A corresponding to the round portion 71A and a linear portion 72B corresponding to the flat plate 71B.

A rise portion 72C is provided along an outer edge of the arc portion 72A and is partly cut at a position corresponding to the linear portion 72B. The top Plate 72 is centrally provided with two engaging projections 72D spaced from each other. The flexible circuit board 6 is to be engaged with the engaging portions 72D. A taper surface 72E is provided between the engaging projections 72D to support the flexible circuit board 6.

Figure 12:
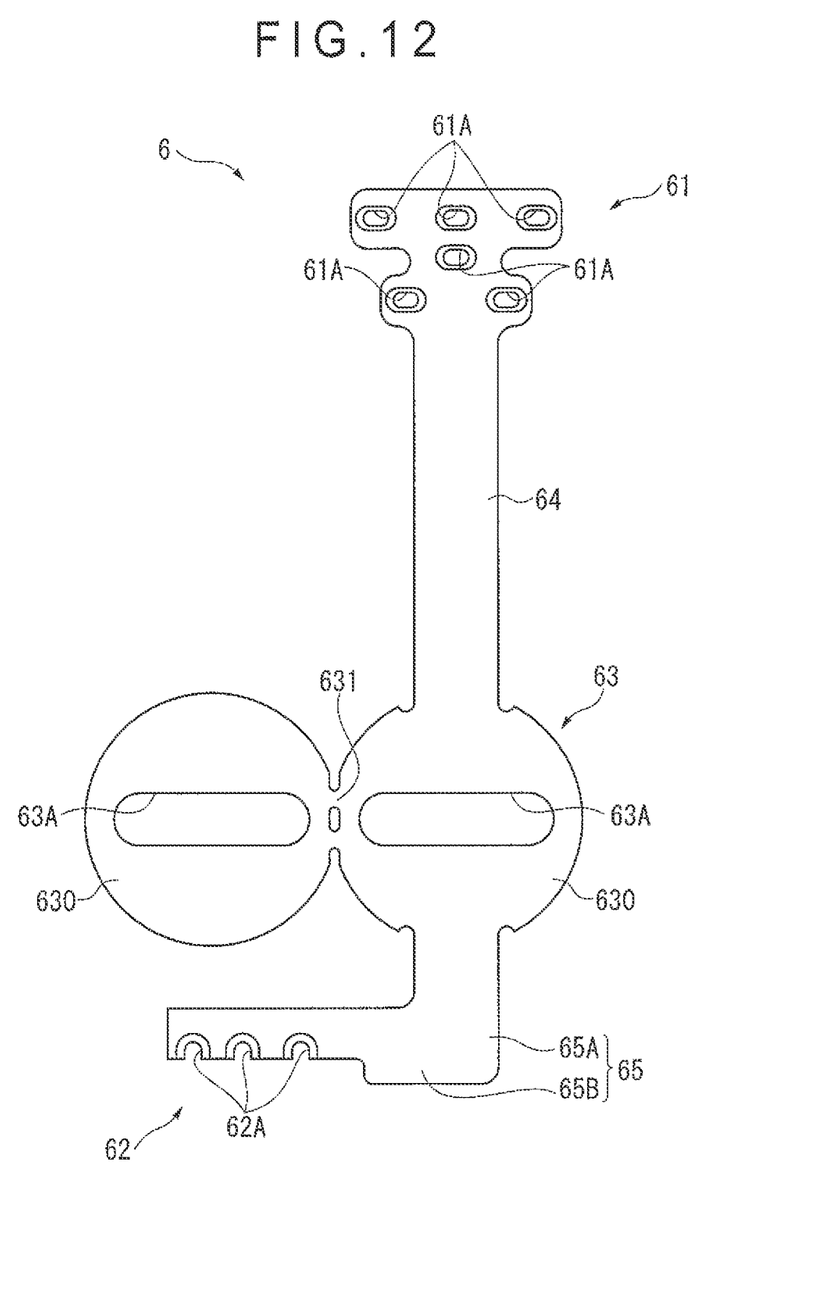
FIG. 12 is an expansion plan showing a flexible circuit board.

FIG. 12 shows an arrangement of the flexible circuit board 6 in detail. FIG. 12 is an expansion plan showing the flexible circuit board 6.

As shown in FIGS. 1, 2, 6 and 12, the flexible circuit board 6 includes: a first end 61 being connected to the terminals 5; a second end 62 being connected to the side circuit 9B; a planar intermediate portion 63 being provided between the first end 61 and the second end 62 and bonded to the spacer 7; a first connecting portion 64 connecting the planar intermediate portion 63 and the first end 61; and a second connecting portion 65 connecting the planar intermediate portion 63 and the second end 62.

The first end 61 is provided with engaging holes 61A that are to be engaged with the terminals 5.

The second end 62, which is attached to the substrate-connection pad 9B1 of the side circuit 9B, has an attachment portion provided with an arc portion 62A shaped in conformity with the substrate-connection pad 9B1.

The planar intermediate portion 63 has a plum circular portion 630 that is substantially identical in shape to the top plate 72. The circular portion 630 is centrally provided with an elongated hole 63A that is to be engaged with the engaging projections 72D of the top plate 72. Incidentally, the circular portion 630 includes a first circular portion and a second circular portion, which are connected to each other via a connecting portion 631 and doubled over around the connecting portion 631 (i.e., a folding point).

The first connecting portion 64 is bent near the planar intermediate portion 63 to be inserted between the top plate 72 and the lid 32. The bent portion is supported by the taper surface 72E provided between the engaging projections 72D (see, FIG. 1).

The second connecting portion 65 includes; a short portion 65A provided opposite to the first connecting portion 64 across the planar intermediate portion 63; and a long portion 65B bent at a right angle relative to the short portion 65A to be connected to the second end 62.

Prior to an assembling process of the sensor with the above arrangement, the synthetic resin base 4 is manufactured by injection molding in advance.

A copper pattern is formed over the entire surface of the synthetic resin base 4 and then an unnecessary part of the copper pattern is removed by etching while a necessary part is plated with gold, thereby forming the three-dimensional circuit 9.

Subsequently, the sensor module 2 is welded to the mount 12C of the joint 1 and then the projecting portion 12B of the joint 1 is inserted into the synthetic resin base 4.

At this time, the synthetic resin base 4 is positioned relative to the joint 1 by sliding the synthetic resin base 4 relative to the projecting portion 12B in the axial direction of the projecting portion 12B and/or rotating the synthetic resin base 4 relative to the projecting portion 12B in the circumferential direction of the projecting portion 12B.

The bonding-connection pad 9A1 of the top circuit 9A on the top 41 of the synthetic resin base 4 is wire-bonded to the strain gauge 220 of the sensor module 2.

The flexible circuit board 6 is attached to the spacer 7 with the second end 62 of the flexible circuit board 6 being connected to the side circuit 9B and then the spacer 7 is attached in the joint 1. Subsequently, the housing 3 is attached to the joint 1 with the first end 61 of the flexible circuit board 6 being connected to the terminals 5.

The exemplary embodiment as described above provides, for instance, the following advantages (1) to (8).

(1) In the arrangement of the sensor, the terminals 5 provided to the housing 3 are electrically connected to the strain gauge 220 of the sensor module 2 provided to the projecting portion 12B of the joint 1 via the conductive member 10, the cap-shaped synthetic resin base 4 having the top 41 provided with the opening 41A in which the strain gauge 220 of the sensor module 2 is exposed is attached to the projecting portion 12B of the joint 1, and the electronic component 8 is mounted on the lateral portions 42B of the synthetic resin base 4 that intersect the top 41 provided with the opening 41A. The inner circumferential surface of the synthetic resin base 4 and the outer circumferential surface of the projecting portion 12B are slidable relative to each other. The conductive member 10 includes: the flexible circuit board 6 with the first end being connected to the terminals 5 and the second end being connected to the synthetic resin base 4; and the three-dimensional circuit 9 being three-dimensionally arranged continuously along the top 41 and the lateral portions 42B of the synthetic resin base 4. While one end of the three-dimensional circuit 9 is connected to the flexible circuit board 6, the electronic component 8 is mounted on the three-dimensional circuit 9. With the above arrangement, since the electronic component 8 is mounted directly on the synthetic resin base 4 on which the three-dimensional circuit 9 is arranged, the assembling process of the sensor can be simplified as compared with a typical arrangement where a flexible circuit board is bent to be attached to the top and the lateral portions of a metal base. Further, when the synthetic resin base 4 is to be attached to the joint 1, while the projecting portion 12B, Which projects along the port 1A of the joint 1, is inserted into the synthetic resin base 4, the synthetic resin base 4 is slid along the outer circumferential surface of the projecting portion 12B and thus the axial and circumferential positions of the synthetic resin base 4 can be easily adjusted.

(2) The inner circumferential surface 4A of the synthetic resin base 4 and the outer circumferential surface of the projecting portion 12B of the joint 1, which are in close contact with each other, are cylindrically shaped to be circumferentially rotatable and axially slidable relative to each other, so that the circumferential and axial positions of the synthetic resin base 4 relative to the joint 1 can be smoothly adjusted as desired.

(3) The side circuit 9B on the synthetic resin base 4 is provided with the grounding lead 9B2, one end of which reaches the open end of the synthetic resin base 4 opposed to the bottom 12A3 of the metal joint 1. Therefore, the electronic component 8 can be easily grounded through the grounding lead 9B2 and the joint 1.

(4) The open end of the synthetic resin base 4 and the bottom 12A3 of the joint 1 are bonded to each other with the electrically conductive adhesive 90. Therefore, since the electrically conductive adhesive 90 is applied only to the grounding portion, the electrically conductive adhesive 90 does not stick to a pattern other than the grounding portion.

(5) The lateral portions 42B of the synthetic resin base 4 are opposed to each other and each have a flat portion on which the electronic component 8 is to be mounted. Therefore, solder can be applied by squeegee printing and, further, a usual chip mounter for mounting electronic components can be used.

(6) The three-dimensional circuit 9 includes: the bonding-connection pad 9A1 wire-bonded to the strain gauge 220 of the sensor module 2; and the external-connection pad 9A2 for external connection that is coplanar with the bonding-connection pad 9A1, so that bonding can be easily done.

(7) The synthetic resin base 4 has the housing space 4B for accommodating the sensor module 2. The housing space 4B is defined from the upper edge of the inner circumferential surface 4A to the opening 41A and is in a cylindrical shape smaller in diameter than the space defined by the inner circumferential surface 4A, so that the stepped portion 4A1 between the inner circumferential surface 4A and the housing space 4B is opposed to the shoulder of the projecting portion 12B. Therefore, even when the projecting portion 12B is excessively pushed into the synthetic resin base 4, the projecting portion 12B comes to contact with the stepped portion 4A1, thereby preventing the tip end of the synthetic resin base 4 from accidental contact with the sensor module 2. Such an effect also facilitates the assembling process of the sensor.

(8) The synthetic resin base 4 is provided with the weight-reducing hollow spaces 4C to reduce the weight of the sensor as a whole.

It should be appreciated that the invention is not limited to the above-described exemplary embodiment(s) but includes modifications and improvements as long as such modifications and improvements are compatible with the invention.

For instance, in the exemplary embodiment, the inner circumferential surface 4A of the synthetic resin base 4 and the outer circumferential surface of the projecting portion 12B of the joint 1 are cylindrically shaped to be in close contact with each other. However, according to the invention, it is not requisite that the inner circumferential surface 4A and the outer circumferential surface of the projecting portion 12B be in close contact with each other along the entire circumferences thereof. Accordingly, for instance, the inner circumferential surface 4A of the synthetic resin base 4 may be cylindrical while the projecting portion 12B of the joint 1 is a round member that is partially cut off with the rest thereof being in an arc shape or, alternatively, the inner circumferential surface 4A of the synthetic resin base 4 and the outer circumferential surface of the projecting portion 12B of the joint 1 may each be in the shape of a polygonal column to be in close contact with each other.

According to the invention, it is also not requisite that the grounding lead 9B2 be provided to the lateral portions 42B of the synthetic resin base 4.

Further, the weight-reducing hollow space 4C is not requisite for the synthetic resin base 4, so that the synthetic resin base 4 may have no hollow space except one defined by the inner circumferential surface 4A into which the projecting portion 12B is inserted.

According to the invention, the spacer 7 is not requisite.

The invention is applicable to any sensor as well as a pressure sensor.

The invention claimed is:

1. A sensor comprising:
a joint comprising: a port through which target fluid is introduced; and a projecting portion that projects from a bottom of the joint along the port;
a sensor module being provided to the joint, the sensor module comprising a detector that is displaceable in response to a pressure of the introduced target fluid;
a housing in which the sensor module is accommodated, the housing comprising a terminal;
a conductive member being configured to electrically connect the detector of the sensor module to the terminal;
a cap-shaped synthetic resin base being provided to the projecting portion of the joint, the synthetic resin base having a top provided with an opening in which the detector of the sensor module is exposed, the synthetic resin base having an inner circumferential surface slidable along an outer circumferential surface of the projecting portion of the joint; and
an electronic component being provided to a lateral portion of the synthetic resin base that intersects the top of the synthetic resin base provided with the opening, wherein
the conductive member comprises: a flexible circuit board having a first end connected to the terminal and a second end connected to the synthetic resin base; and a three-dimensional circuit being connected to the electronic component, the three-dimensional circuit being three-dimensionally arranged continuously along the top and the lateral portion of the synthetic resin base, the three-dimensional circuit having one end connected to the flexible circuit board.

2. The sensor according to claim 1, wherein the inner circumferential surface of the synthetic resin base and the outer circumferential surface of the projecting portion of the joint are cylindrically formed.

3. The sensor according to claim 1, wherein
the joint is made of metal, and
the lateral portion of the synthetic resin base is provided with a grounding lead having an end that reaches an open end of the synthetic resin base opposed to the bottom of the joint.

4. The sensor according to claim 3, wherein the open end of the synthetic resin base and the bottom of the joint are fixed to each other with an electrically conductive adhesive.

5. The sensor according to claim 1, wherein the lateral portion of the synthetic resin base comprises opposed flat portions on which the electronic component is mountable.

6. The sensor according to claim 1, wherein a bonding-connection pad to which the detector of the sensor module is wire-bonded is coplanar with an external-connection pad for external connection.

* * * * *